US00RE34198E

United States Patent [19]

Quasnick

[11] E Patent Number: Re. 34,198

[45] Reissued Date of Patent: Mar. 23, 1993

[54] CORRUGATED CONSTRUCTION PALLET

[75] Inventor: Robert J. Quasnick, Jacksonville, Fla.

[73] Assignee: Gate Pallet Systems, Inc., Crown Point, Ind.

[21] Appl. No.: 756,460

[22] Filed: Sep. 9, 1991

Related U.S. Patent Documents

Reissue of:

[64] Patent No.: 4,867,074
Issued: Sep. 19, 1989
Appl. No.: 321,836
Filed: Mar. 10, 1989

[51] Int. Cl.[5] ..... B65D 19/20
[52] U.S. Cl. ..... 108/51.3; 108/51.1
[58] Field of Search ..... 108/51.1, 53.1, 56.1

[56] References Cited

U.S. PATENT DOCUMENTS

| | | | |
|---|---|---|---|
| 2,728,545 | 12/1955 | Hermitage | 108/51.3 |
| 3,683,822 | 8/1972 | Roberts et al. | 108/56.1 X |
| 4,563,377 | 1/1986 | Melli | 108/51.3 X |
| 4,792,325 | 12/1988 | Schmidtke | 108/51.3 X |
| 4,802,421 | 2/1989 | Atterby et al. | 108/51.3 X |

FOREIGN PATENT DOCUMENTS

| | | | |
|---|---|---|---|
| 996516 | 6/1965 | United Kingdom | 108/51.3 |
| 1134601 | 11/1968 | United Kingdom | 108/51.3 |

*Primary Examiner*—Peter A. Aschenbrenner
*Attorney, Agent, or Firm*—Dressler, Goldsmith, Shore, Sutker & Milnamow, Ltd.

[57] ABSTRACT

A pallet made of corrugated material employs stringers in which panel portions therewithin are secured in oblique positions, against the external sidewall panel portions to afford enhanced lateral stability and resistance to failure.

8 Claims, 3 Drawing Sheets

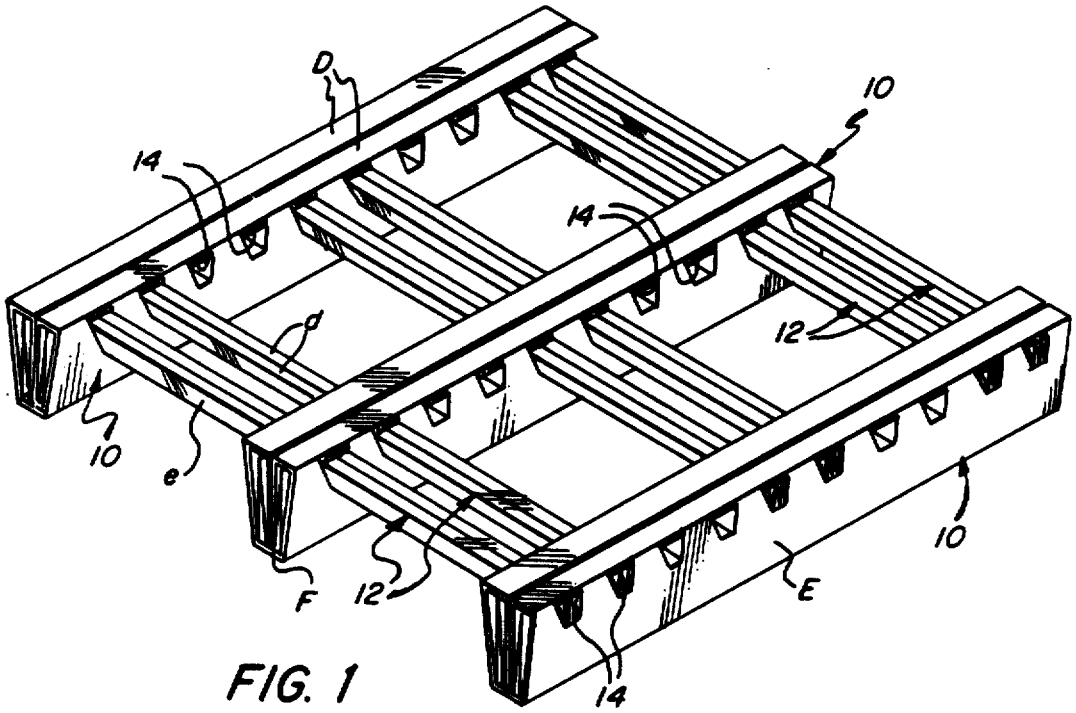
FIG. 1
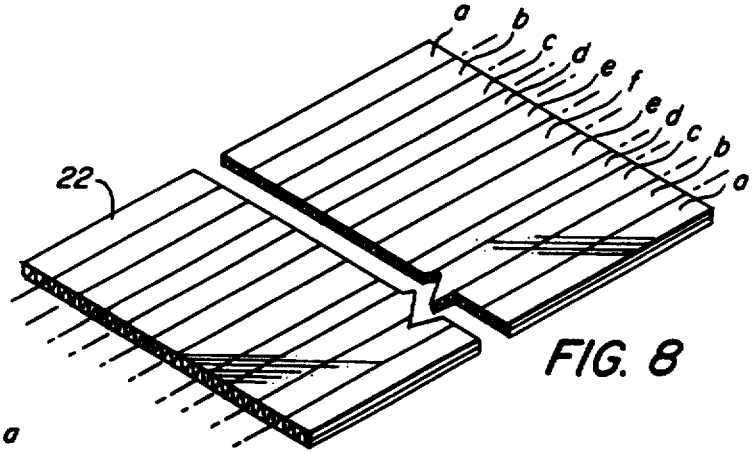
FIG. 8
FIG. 9
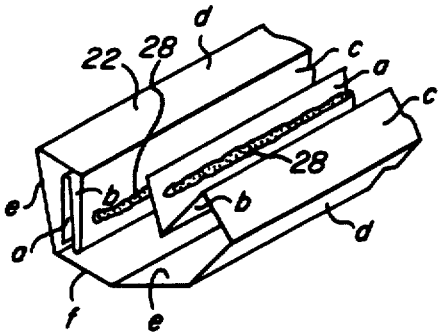
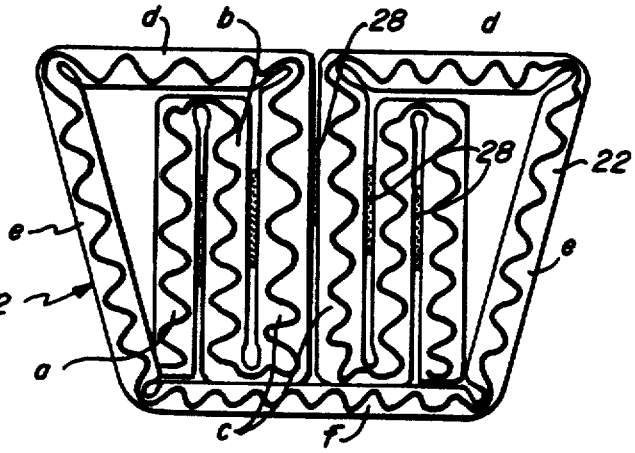
FIG. 7

CORRUGATED CONSTRUCTION PALLET

Matter enclosed in heavy brackets [ ] appears in the original patent but forms no part of this reissue specification; matter printed in italics indicates the additions made by reissue.

BACKGROUND OF THE INVENTION

Disposable pallets made of corrugated paper are known in the art and have been commercially available for a number of years. Such pallets are disclosed for example in Hermitage U.S. Pat. No. 2,728,545, on December 27, 1955, and Roberts et al U.S. Pat. No. 3,683,822, on Aug. 15, 1972; Schmidtke, U.S. Pat. No. 4,792,325, which issued on Dec. 20, 1988, provides a method and machine for making a cardboard pallet.

To be satisfactory for their intended purpose, it is of course necessary that such pallets exhibit an advantageous strength-to-weight ratio, and also that they be capable of withstanding considerable abuse, particularly under conditions that would typically be encountered during commercial shipment of a load thereupon. While the prior art structures of this kind have been found to be generally satisfactory, one area of notable deficiency resides in the levels of lateral stability that they afford; specifically, the load carried by a pallet tends to shift in transit, or at least to impose forces thereupon that are of varying magnitude and direction. Pallets that do not offer adequate lateral stability will tend to fail, the liklihood thereof depending of course upon the mass of the load, the conditions to which it is subjected in transit, time factors, etc.

Accordingly, it is an object of the present invention to provide a novel disposable pallet, made of corrugated paper or like material, which exhibits an advantageous strength-to-weight ratio coupled with a high degree of lateral stability and resistance to collapse under shifting load conditions.

It is a related object of the invention to provide a novel method for producing a pallet having the foregoing features and advantages, which method can be carried out on equipment presently used for the manufacture of similar pallet components, with little or no need for alteration thereof.

Additional objects of the invention are to provide such a pallet and method which are highly advantageous from economic standpoints.

SUMMARY OF THE INVENTION

It has now been found that certain of the foregoing and related objects of the invention are readily attained by the provision of a pallet comprised of a plurality of elongated stringer members, and a multiplicity of elongated decking members assembled therewith. Each of the stringer members employed is of trapezoidal cross section, being relatively wide at the top and relatively narrow at the bottom, and is made from a single piece of material folded to form symmetrical half sections that are disposed to the opposite sides of a longitudinally extending medial plane of the stringer member. Each half section comprises five sequentially contiguous rectangular panel portions, the first, second and third of which, taken in sequence, are internal panel portions and are of substantially the same width; the half sections are joined by a common central panel portion at the bottom of the stringer member, with the third panel portions thereof disposed in face-to-face contact along its medial plane. The fifth panel portions are disposed on the opposite sides of the stringer member, and they are connected to the common panel portion and diverge from it. The fourth panel portions extend inwardly from the fifth panel portions at the top of the stringer member, they lie in a plane that is parallel to that of the common panel portion, and is perpendicular to the medial plane. The panel portions are so dimensioned that the internal ones of each half section extend substantially fully between the fourth panel portion and the common panel portion, with the ends of the internal portions, adjacent the common panel portion, compacted between the fifth panel portions of the member. An adhesive substance is present on the opposite sides of the first panel portion in each half section, to secure it in face-to-face mutual contact with both the second the fifth panel portions thereof, thereby maintaining the first and second panel portions in oblique position against the fifth panel portion. A multiplicity of apertures are provided in the first, second, third and fifth panel portions, at longitudinally spaced locations therealong, with correspondingly located ones lying in registry to define a multiplicity of passages extending traversely through the stringer members. The decking members extend through, and are tightly engaged within, the passages of a plurality of stinger members, disposed parallel to one another.

Preferably, the first and second panel portions referred to hereinabove will be disposed at an included angle of about 97° to 100° to the common panel portion, and adhesive substance applied to the fourth panel portions will extend longitudinally along its apertures and into the regions lying between them. Usually, the decking members will also be of trapezoidal cross section, disposed in the pallet so as to be relatively wide at the top and relatively narrow at the bottom. Like the stringers, the decking member will normally be made from a single piece of material, folded to form symmetrical half sections disposed to the opposite sides of a longitudinally extending medial plane. Most desirably, the top and bottom width dimensions and the height dimension of the stringer members will be 3¼, 1⅛ and 5¼ inches, respectively, and the corresponding dimensions of the decking members will be 2¼, 1¼ and 1⅛ inches. The material used to fabricate the members of the pallet will typically and advantageously be 275 pound C-flute corrugated paper.

Other objects of the invention are attained by the provision of a method for manufacturing a pallet having the features hereinabove set forth. In accordance with it, a plurality of pieces of material, or blanks, are provided which are adapted for folding to form the symmetrical half sections of the stringer member, each piece of material having two symmetrical parts opposite its ends, comprised of five sequentially contiguous rectangular panel portions, joined by a common central panel portion. A multiplicity of apertures are formed through the first, second, third and fifth panel portions, as taken in sequence from opposite ends of the piece of material, at longitudinally spaced locations therealong. Thereafter, an adhesive substance is applied to the fourth panel portions, on one side of the material, and also to either the first or the second panel portions on the other side thereof; as hereinabove indicated, the adhesive substance applied to the fourth panel preferably extends longitudinally along its apertures and into the regions lying therebetween. The piece of material is then folded outwardly to bring the first and second panel portions of each symmetrical part against one another, with their faces in mutual contact and with the adhesive substance disposed between them. The blank is thereafter folded inwardly to erect the stringer member, constructed as hereinabove set forth. Finally, a multiplicity of suitably dimensioned and configured elongated decking members are inserted through, and tightly engaged within, the passages of a plurality of the stringer members, disposed parallel to one another, so as to thereby provide the pallet.

BRIEF DESCRIPTION OF THE DRAWINGS

FIG. 1 is a perspective view of a pallet embodying the present invention;

FIG. 7 is an end view of a decking member employed in the construction of the pallet, drawn to the scale of FIG. 4;

FIG. 8 is a fragmentary perspective view of the blank utilized to produce the decking member of FIG. 7; and FIG. 9 is a fragmentary perspective view, diametrically illustrating the manner in which the blank of FIG. 8 is folded to produce the decking member.

DETAILED DESCRIPTION OF THE ILLUSTRATED EMBODIMENT

Figure 2:
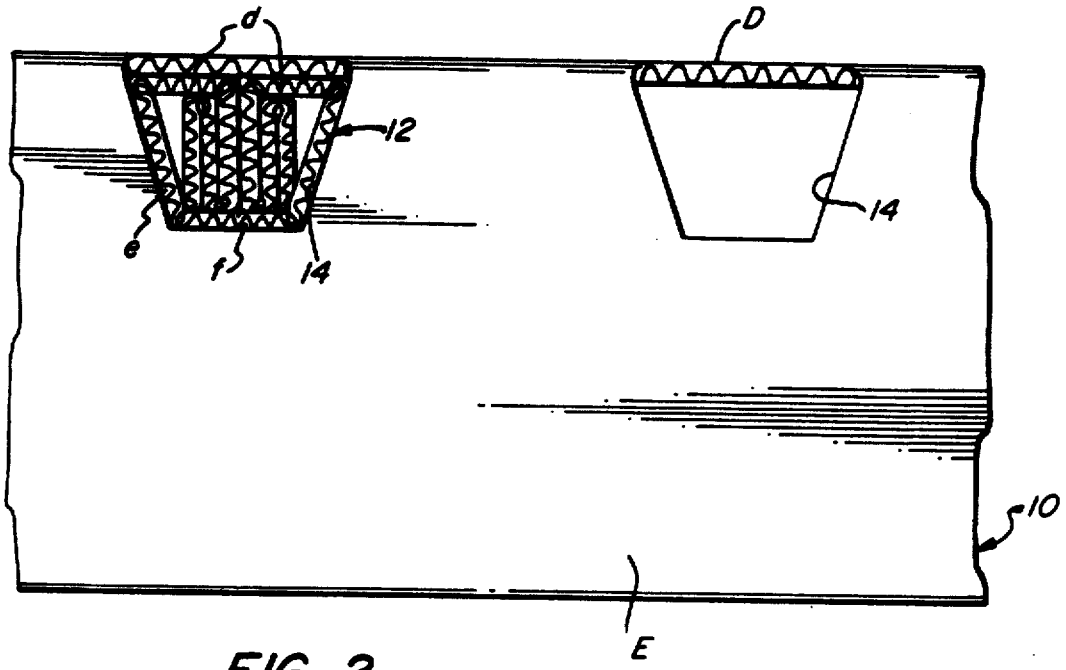
FIG. 2 is a fragmentary side elevational view of the pallet of FIG. 1, drawn to an enlarged scale.
Figure 3:
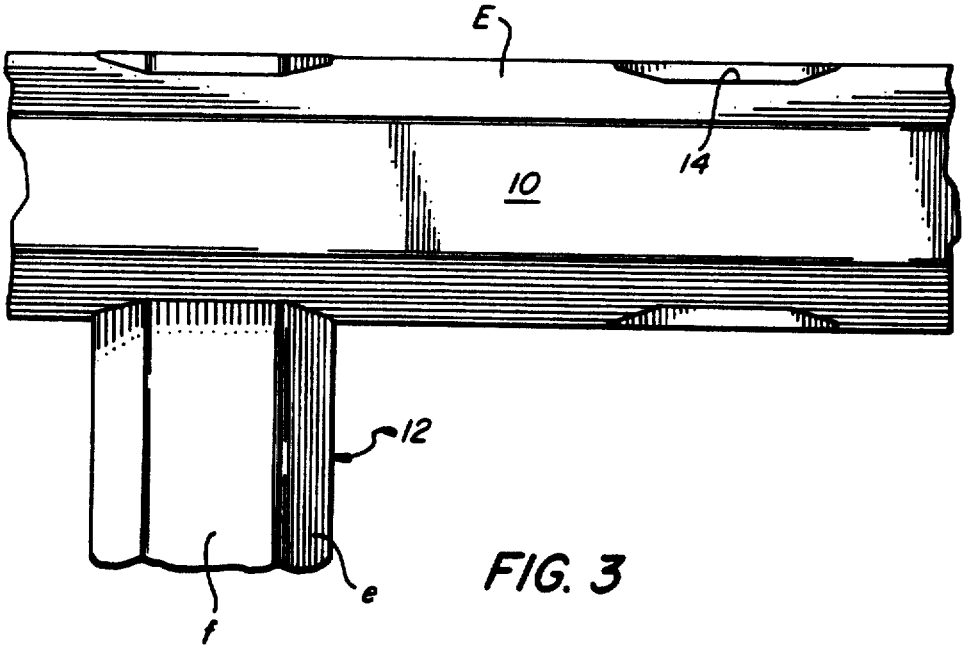
FIG. 3 is a bottom view of the pallet, drawn to the scale of FIG. 2.

Turning now in detail to the appended drawings, FIGS. 1-3 show a pallet embodying the present invention and consisting of three parallel stringers, each generally designated by the numeral 10, with which are assembled six parallel decking members, each generally designated by the numeral 12. As can be seen, each of the stringers has, adjacent its upper end, a series of ten equidistantly spaced passages 14 extending transversely through it, the passages being dimensioned and configured to conform to, and to snugly receive and tightly engage, the inserted decking members 12. Both the stringers 10 and also the decking members 12 are of trapezoidal cross section, and they are oriented in the pallet assembly with their narrower ends downwardly directed.

Figure 5:
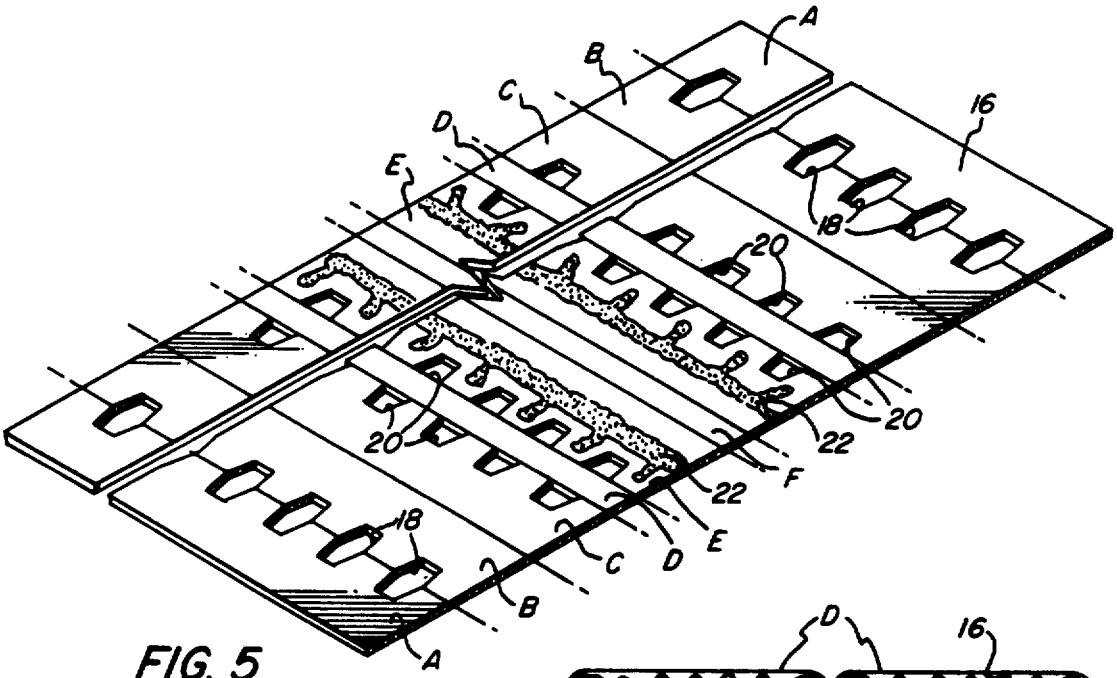
FIG. 5 is a fragmentary perspective view of the blank utilized for the production of the stringer of FIG. 4, drawn to a scale reduced therefrom.
Figure 6:
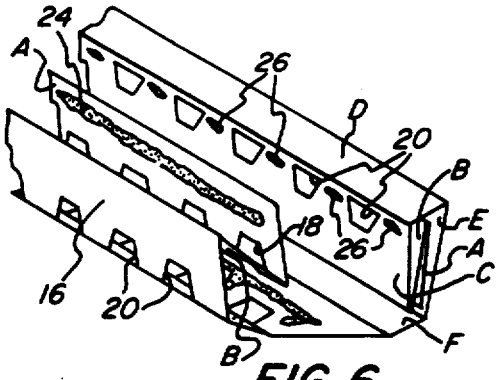
FIG. 6 is a fragmentary perspective view, diagrammatically illustrating the manner in which the blank of FIG. 5 is folded to produce the stringer.
Figure 4:
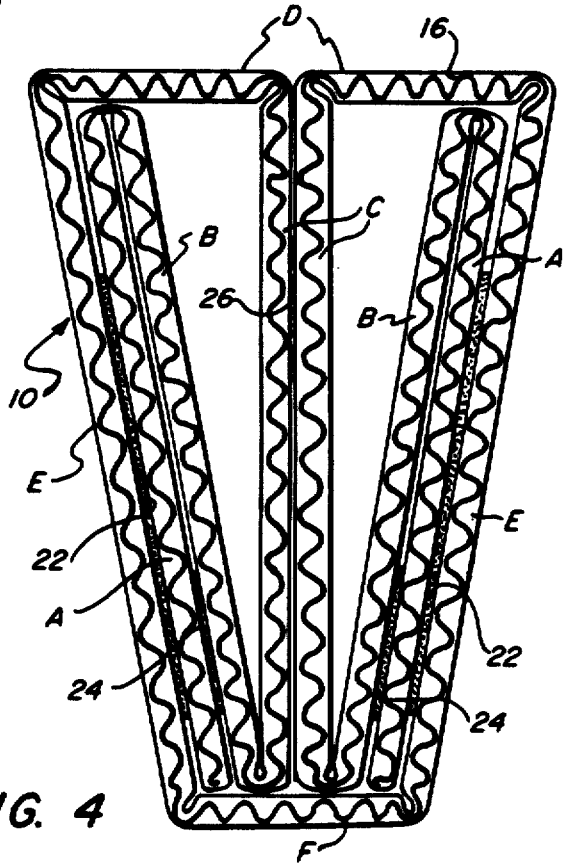
FIG. 4 is an end view of one of the stringers utilized in the construction of the pallet of the invention, drawn to a scale further enlarged from that of the previous Figures.

Referring in greater detail to FIGS. 4-6, it can be seen that the stringers 10 are made from elongated rectangular blanks 16 of corrugated material, divided by transversely extending score lines into eleven foldable, contiguous panel portions. The blank 16 is symmetrical about the central panel portion; for convenience of reference, the sequential panel portions of each symmetrical part are lettered A-E, taken from the opposite ends of the blank 16, and the central portion is designated F.

In the manufacturing procedure, the blank 16 is formed with apertures 18 and 20, which are aligned on mutually perpendicular axes. The apertures are also spaced equidistantly across the panel portions so that, when folded, the apertures 18, 20 register with one another to produce the passages 14 through the stringer 10. Glue deposits 22, 24 and 26 are applied to the blank 16, for securing the several panels to one another; it will be noted that the deposit 22 has elements that extend not only along the length of the panels E but also into the regions between the apertures 20 therein.

To erect the stringer, the panel portion A is initially folded outwardly into contact with the portion B, thereby bonding them in face-to-face contact. The panel portions of the blank are then folded inwardly, ultimately bringing them to the relationships shown in FIG. 4. As can be seen, the panel portions C of the two symmetrical parts of the blank are secured in face-to-face contact on a medial plane extending longitudinally of the stringer. The common panel F is disposed at the bottom, and the panels D are at the top, parallel to the panel F and perpendicular to the medial plane. The panel portions E diverge from the panel portion F (at an included angle of about 98°), and provide the exterior side walls of the member. By virtue of the adhesive deposits 22 and 24 the internal panel portions A and B are fixed to the panel portions E (as considered of course within the respective half sections of the stringer in which they reside).

With reference now FIGS. 7-9, it will be appreciated that the decking member 12 is produced in much the same manner as is the stringer 10. Once again, suitable adhesive deposits 28 are applied to the surfaces of certain of the panel portions a-f of the blank 22, as appropriate, after which they are folded in the manner indicated in FIG. 9. Following curing of the adhesive substance, the components are readily assembled with one another to construct the pallet by forcing the decking members 12 through the passages 14 of the stringers 10, as will be self-evident.

Although dimensions of the components can vary, it has been found that, when 275 pound C-flute corrugated paper is employed for the blanks, the values hereinabove set forth afford optimal strength-to-weight properties. Most notably, it found that by use of the stringer construction herein described a surprising degree of lateral stability is afforded to the instant pallets, as compared to those of the prior art; the following is exemplary:

EXAMPLE ONE

Two forms of pallets are assembled, both having the construction shown in FIG. 1 but utilizing ten decking members rather than the six depicted; they employ three stringers and measure 48×40 inches, as is conventional. The members are all fabricated from 275 pound C-flute corrugated paper, and they have the width and height dimensions hereinabove set forth.

The sole difference between the two forms of pallets resides in the construction of the stringers used. In one case (hereinafter referred to as pallets "I") they have the structure illustrated in FIG. 4; that is, the internal panel portions A and B are secured (at the stated angle) against outer side panel portions E. In the other pallet construction (hereinafter referred to as pallets "II") the interior panel portions A and B are secured against the interior walls of the stringer provided by panel portions C.

Six of each form of the pallets are loaded with 2000 pounds of sand bags, which are strapped in place. Each pallet is mounted on a jogging machine made to the specifications of the National Safe Transit Authority, and the machine is run with a five inch drop at one hundred eighty-five revolutions per minute. A test of forty minutes duration under those conditions is deemed by the NSTA to simulate (in terms of abuse) a trip from the East coast of the United States to the West coast, in forty-five foot tractor trailer subjected to normal road conditions.

It is found that all of the pallets I, embodying the invention, survive the test, without collapse. On the other hand, the pallets II, indicative of the prior art, survive only twelve minutes testing on the jogging machine, during which period they fail by virtue of lateral stringer collapse.

It will be appreciated that variations may be made in the pallet construction, and method of production thereof, without departing from the scope of the instant invention. For example, rather than using paperboard blanks for the fabrication of the components, corrugated plastic materials can be employed with similar benefit. Other modifications will occur to those skilled in the art.

Thus, it can be seen that the invention provides a novel disposable pallet, made of corrugated paper or like material, which exhibits an advantageous strength-to-weight ratio, coupled with a high degree of lateral stability and resistance to collapse under shifting load conditions. The invention also provides a novel method for producing a pallet having the foregoing features and advantages, which method can be carried out on equipment presently used for the manufacture of similar pallet components, with little or no need for alteration thereof. The pallet and method of the invention are highly advantageous from economic standpoints.

Having thus described the invention, what is claimed is:

1. In a pallet comprised of a plurality of elongated stringer members and a multiplicity of elongated decking members assembled therewith, each of said stringer members being of trapezoidal cross section, relatively wide at the top and relatively narrow at the bottom, and being made from a single piece of material folded to form symmetrical half sections of said stringer member, said half sections being disposed to the opposite sides of a longitudinally extending medial plane thereof, each of said half sections comprising five sequentially contiguous rectangular panel portions, the first, second and third of which, taken in sequence, being internal panel portions and being of substantially the same width, said half sections being joined by a common central panel portion at the bottom of said stringer member with said third panel portions thereof disposed in face-to-face contact along said medial plane, said fifth panel portions being disposed on the opposite sides of said stringer member and being connected to said common panel portion and diverging therefrom, said fourth panel portions extending inwardly from said fifth panel portions at the top of said stringer member in a plane parallel to the plane in which said common panel portions is disposed and perpendicular to said medial plane, said panel portions being so dimensioned that said internal panel portions of each of said half sections extend substantially fully between said fourth panel portion thereof and said common panel portion, and so as to cause the ends of said internal panel portions adjacent said common panel portion to be compacted between said fifth panel portions, and first, second, third and fifth panel portions having a multiplicity of apertures therethrough at longitudinally spaced locations therealong, with correspondingly located apertures of said panel portions lying in registry to define a multiplicity of passages extending traversely through said stringer members, said decking members extending through, and being tightly engaged within, said passages of a plurality of said stinger members disposed parallel to one another; the improvement wherein an adhesive substrate is present on the opposite sides of said first panel portion in each of said half sections to secure it in face-to-face mutual contact with both said second and said fifth panel portions thereof, to thereby maintain said first and second panel portions in oblique position against said fifth panel portion.

2. The pallet of claim 1 wherein said first and second panel portions are disposed at an included angle of about 97° to 100° to said common panel portion.

3. The pallet of claim 1 wherein said adhesive substance extends longitudinally along said apertures of said fourth panel portions into the regions of said panel portions lying therebetween.

4. The pallet of claim 3 wherein said decking members are also of trapezoidal cross section, relatively wide at the top and relatively narrow at the bottom, each said decking member being made from a single piece of material folded to form symmetrical half sections disposed to the opposite sides of a longitudinally extending medial plane thereof; wherein the top and bottom width dimensions and the height dimension of each of said stringer members are 3¼, 1½ and 5¼ inches, respectively, and said included angle is about 98°; wherein the top and bottom width dimensions and the height dimension of each of said decking members are 2¼, 1¼ and 1½ inches, respectively; wherein said passages through said stringer members conform closely in cross section to said decking members, and the tops thereof are defined by said fourth panel portions; and wherein said material of which each of said members is made is 275 pound C-flute corrugated paper.

5. In a method for manufacturing a pallet comprised of a plurality of elongated stringer members of trapezoidal cross section, relatively wide at the top and relatively narrow at the bottom, and a multiplicity of elongated decking members assembled therewith, the steps comprising:

a. providing a plurality of pieces of material, each being adapted for folding to form symmetrical half sections of a stringer member with said half sections disposed to the opposite sides of a longitudinally extending medial plane thereof, each said piece of material having two symmetrical parts at opposite ends thereof comprised of five sequentially contiguous rectangular panel portions, said parts being joined by a common central panel portion;

b. forming a multiplicity of apertures through the first, second, third and fifth panel portions, as taken in sequence from said opposite ends of each said piece of material, at longitudinally spaced locations therealong;

c. applying an adhesive substance to the fourth panel portions, on one side of each said piece of material, and also to either said first or said second panel portions, on the other side thereof;

d. folding each said piece of material outwardly to bring said first and second panel portions of each of said symmetrical parts thereof against one another, with the faces of said first and second panel portions on said other side in mutual contact and with said adhesive substance applied thereto therebetween;

e. folding each said piece of material inwardly to erect one of said stringer members with said central panel portions at the bottom thereof, with said third panel portions of said symmetrical parts disposed in face-to-face contact along said medial plane, with said fifth panel portions disposed on the opposite sides thereof and diverging from said common panel portion therefrom, and with said fourth panel portions extending inwardly from said fifth panel portions at the top thereof in a plane parallel to the plane in which said common panel portion is disposed and perpendicular to said medial plane, said panel portions being so dimensioned that said first, second and third panel portions of each said half sections of said stringer member extend substantially fully between said fourth panel portion thereof and said common panel portion, and so as to cause the ends of said first, second and third panel portions adjacent said common panel portion to be compacted between said fifth panel portions, each said half sections thereby having said first panel portion secured by said adhesive substance in face-to-face mutual contact with both said second and said fifth panel portions thereof, to thereby maintain said first and second panel portions in oblique position against said fifth panel portion, said apertures correspondingly located on said first, second, third and fifth panel portions lying in registry to define a multiplicity of passages extending transversely through said stringer member;

f. providing a multiplicity of elongated decking members dimensioned and configured to fit tightly within said passages of said stringer member; and g. inserting said decking members through, and tightly engaging them within, said passages of a plurality of said stringer members, disposed parallel to one another, to provide said pallet.

6. The method of claim 5 wherein said adhesive substance is applied to extend longitudinally along said apertures of said fourth panel portions and into the regions of said panel portions lying therebetween.

*7. A pallet comprising a plurality of elongated stringer members and a multiplicity of elongated decking members assembled therewith, at least some of said stringer members being of trapezoidal cross section, relatively wide at the top and relatively narrow at the bottom, and being made from a single piece of material folded to form symmetrical half sections of said stringer member, said half sections being disposed to the opposite sides of a longitudinally extending medial plane thereof, each of said half sections comprising at least four sequentially contiguous rectangular panel portions, at least two of which in each of said half sections, taken in sequence, being internal panel portions and being of substantially the same width, said half sections being joined by a common central panel portion at the bottom of said stringer member with respective ones of said internal panel portions of said half sections disposed in face-to-face contact along said medial plane, another of said panel portions of each half section being disposed on the outside of said stringer member and being connected to said common panel portion and diverging outwardly and away therefrom, another of said panel portions of each half section extending inwardly from said diverging portion thereof at the top of said stringer member in a plane parallel to the plane in which said common panel portion is disposed and perpendicular to said medial plane, said panel portions being so dimensioned that said internal panel portions of each of said half sections extend substantially fully between said panel portion thereof at the top of said stringer member and said common panel portion, said internal and diverging panel portions having a multiplicity of apertures therethrough at longitudinally spaced locations therealong, with correspondingly located apertures of said internal and diverging panel portions lying in registry to define a multiplicity of passages extending transversely through said stringer members, said decking members extending through, and being tightly engaged within, said passages of a plurality of said stringer members disposed parallel to one another, an adhesive substance being present on at least one of said internal panel portions of each of said half sections to secure said at least one of said internal panel portions thereon to said diverging panel portion thereof near the top of said stringer member, thereby to maintain at least one of said panel portions in an oblique position against said diverging panel portion.*

*8. An elongated stringer member for a pallet being a trapezoidal cross section which is relatively wide at the top and relatively narrow at the bottom, and being made from a single piece of material folded to form symmetrical half sections of said stringer member, said half sections being disposed to the opposite sides of a longitudinally extending medial plane thereof, each of said half sections comprising at least four sequentially contiguous rectangular panel portions, at least two of which in each of said half sections, taken in sequence, being internal panel portions and being of substantially the same width, said half sections being joined by a common central panel portion at the bottom of said string member with respective ones of said internal panel portions of said half sections disposed in face-to-face contact along said medial plane, another of said panel portions of each half section being disposed on the outside of said stringer member and being connected to said common panel portion and diverging outwardly and away therefrom, another of said panel portions of each half section extending inwardly from said diverging panel portion thereof at the top of said stringer member in a plane parallel to the plane in which said common panel portion is disposed and perpendicular to said medial plane, said panel portions being so dimensioned that said internal panel portions of each of said half sections extend substantially fully between said panel portion thereof at the top of said stringer member and said common panel portions, an adhesive substance being present on at least one of said internal panel portions of each of said half sections to secure said at least one of said internal panel portions thereof to said diverging panel portion thereof near the top of said stringer member, thereby to maintain at least one said panel portion in an oblique position against said diverging panel portion.*

* * * * *

UNITED STATES PATENT AND TRADEMARK OFFICE

CERTIFICATE OF CORRECTION

PATENT NO. : RE 34198

DATED : March 23, 1993

INVENTOR(S) : Robert J. Quasnick

It is certified that error appears in the above-identified patent and that said Letters Patent is hereby corrected as shown below:

Column 2, line 16, after "second", insert --and--.

Column 5, line before "forty-five" insert --a--.

Column 6, line 7, "stinger" should be --stringer--.

Column 8, line 27, last occurrence of "a" in that line should be deleted and insert --of--.

Column 8, line 53, "portions" should be --portion--.

Signed and Sealed this

First Day of February, 1994

Bruce Lehman

*Attest:*

BRUCE LEHMAN

*Attesting Officer*

*Commissioner of Patents and Trademarks*